United States Patent
Haynes et al.

(10) Patent No.: US 11,136,098 B2
(45) Date of Patent: Oct. 5, 2021

(54) INTEGRATED LIFELINE AND GEOMETRIC RESTRAINT

(71) Applicant: GOODRICH CORPORATION, Charlotte, NC (US)

(72) Inventors: Timothy C Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 193 days.

(21) Appl. No.: 16/544,691

(22) Filed: Aug. 19, 2019

(65) Prior Publication Data

US 2021/0053661 A1    Feb. 25, 2021

(51) Int. Cl.
  *B63C 9/26*    (2006.01)
  *B64D 25/14*    (2006.01)
  *B63C 9/04*    (2006.01)

(52) U.S. Cl.
  CPC .......... *B63C 9/26* (2013.01); *B63C 9/04* (2013.01); *B64D 25/14* (2013.01); *B63C 2009/042* (2013.01)

(58) Field of Classification Search
  CPC ....... B63C 9/04; B63C 9/26; B63C 2009/042; B64D 25/14
  See application file for complete search history.

(56) References Cited

U.S. PATENT DOCUMENTS

| 2,784,425 | A | | 3/1957 | Bicknell |
| 2,859,457 | A | | 11/1958 | Manhart |
| 4,273,215 | A | * | 6/1981 | Leggett ............. A62B 35/0068 119/857 |
| 4,460,062 | A | * | 7/1984 | Fisher ................... B64D 25/14 182/48 |
| 5,921,830 | A | | 7/1999 | Shoaff, III |
| 2004/0023574 | A1 | * | 2/2004 | Calkin ..................... A62B 1/16 441/125 |
| 2019/0105521 | A1 | * | 4/2019 | Roger ................ A62B 35/0012 |

FOREIGN PATENT DOCUMENTS

WO    2019031908    2/2019

* cited by examiner

*Primary Examiner* — Stephen P Avila
(74) *Attorney, Agent, or Firm* — Snell & Wilmer L.L.P.

(57) ABSTRACT

An evacuation slide may comprise an inflatable side rail extending from a head end to a toe end of the evacuation slide. A lifeline-geometric restraint may be coupled to the inflatable side rail. A restraint pin may be coupled to the lifeline-geometric restraint. A first loop may be coupled to a first location on the evacuation slide. A second loop may be coupled to a second location on the evacuation slide. The first loop may be configured to receive the second loop and the second loop may be configured to receive the restraint pin when the evacuation slide is in a folded position. The restraint pin may be configured to translate out the second loop in response to an internal pressure of the evacuation slide exceeding a predetermined internal pressure.

20 Claims, 11 Drawing Sheets

INTEGRATED LIFELINE AND GEOMETRIC RESTRAINT

FIELD

The present disclosure relates to aircraft evacuation systems, and more specifically to an integrated lifeline and geometric restraint for evacuation slides and methods of assembling evacuation systems.

BACKGROUND

An evacuation system may include an inflatable slide that helps passengers disembark from an aircraft in the event of an emergency or other evacuation event. The slides may deploy from a door sill or a side of the aircraft fuselage. In the event of a water landing, the inflatable evacuation slide may be employed as a life raft. As set forth by various government agencies, the evacuation slides/life rafts are to include lifelines that are reachable to persons in the water. Some evacuation slides include geometric restraints to control the sequence and deployment characteristics of the slide. Having a dedicated lifeline and a dedicated geometric restraint tends to increase an overall weight of the slide.

SUMMARY

An evacuation slide is disclosed herein. In accordance with various embodiments, the evacuation slide may comprise an inflatable side rail extending from a head end of the evacuation slide to a toe end of the evacuation slide. A lifeline-geometric restraint may be coupled to the inflatable side rail. A first restraint pin may be coupled to the lifeline-geometric restraint. A first loop may be coupled to a first location on the evacuation slide. A second loop may be coupled to a second location on the evacuation slide. The first loop may be configured to receive the second loop and the second loop may be configured to receive the first restraint pin when the evacuation slide is in a folded position. The first restraint pin may be configured to translate out the second loop in response to an internal pressure of the evacuation slide exceeding a first predetermined internal pressure.

In various embodiments, a length of the lifeline-geometric restraint may be at least 80% of a length of the evacuation slide, the length of the evacuation slide being measured from the head end of the evacuation slide to the toe end of the evacuation slide.

In various embodiments, the lifeline-geometric restraint may include a first strap including a first end coupled to the inflatable side rail proximate the head end of the evacuation slide and a second end opposite the first end coupled to the inflatable side rail proximate the toe end of the evacuation slide. In various embodiments, the lifeline-geometric restraint may include a second strap extending from the first strap. The first restraint pin may be coupled to the second strap.

In various embodiments, the first strap may be coupled to the inflatable side rail at a plurality of locations between the first end and the second end of the first strap. In various embodiments, the first loop may be coupled to the toe end of the evacuation slide. In various embodiments, the lifeline-geometric restraint may further include a cover located over the first restraint pin.

In various embodiments, a second restraint pin may be coupled to the lifeline-geometric restraint. A third loop may be coupled to a third location on the evacuation slide. The third location may be closer to the head end of the evacuation slide as compared to the first location. A fourth loop may be coupled to a fourth location on the evacuation slide. The third loop may be configured to receive the fourth loop. The fourth loop may be configured to receive the second restraint pin when the evacuation slide is in the folded position. The second restraint pin may be configured to translate out the fourth loop in response to the internal pressure of the evacuation slide exceeding a second predetermined internal pressure different from the first predetermined internal pressure. In various embodiments, the second predetermined internal pressure may be less than the first predetermined internal pressure.

A method of assembling an evacuation assembly is also disclosed herein. In accordance with various embodiments, the method may include the steps of coupling a first end of a lifeline-geometric restraint to an inflatable slide, coupling a second end of the lifeline-geometric restraint to the inflatable slide, coupling a first restraint pin to the lifeline-geometric restraint, coupling a first loop to the inflatable slide, and folding the inflatable slide. The method may further include coupling the first loop to the lifeline-geometric restraint by locating a second loop through the first loop and locating the first restraint pin through the second loop.

In various embodiments, the method may further include configuring the first restraint pin to translate out the second loop in response to an internal pressure of the inflatable slide exceeding a first predetermined internal pressure.

In various embodiments, the method may further comprise coupling a string to a ring of the first restraint pin and to a shaft of the first restraint pin. In various embodiments, the method may further comprise coupling a second restraint pin to the lifeline-geometric restraint, coupling a third loop to the inflatable slide, and coupling the third loop to the lifeline-geometric restraint by locating a fourth loop through the third loop and locating the second restraint pin through the second loop.

In various embodiments, the method may further comprise configuring the second restraint pin to translate out the fourth loop in response to the internal pressure of the inflatable slide exceeding a second predetermined internal pressure less than the first predetermined internal pressure. In various embodiments, the third loop may be located closer to a head end of the inflatable slide as compared to the first loop.

In various embodiments, a length of the lifeline-geometric restraint may be at least 80% of a length of the inflatable slide, the length of the lifeline-geometric restraint being measured from the first end of the lifeline-geometric restraint to the second end of the lifeline-geometric restraint, and the length of the inflatable slide being measured from a head end of the inflatable slide to a toe end of the inflatable slide.

In various embodiments, the method may further comprise coupling the lifeline-geometric restraint to the inflatable slide at a plurality of locations between the first end of the lifeline-geometric restraint and the second end of the lifeline-geometric restraint.

A lifeline-geometric restraint for an inflatable slide is also disclosed herein. In accordance with various embodiments, the lifeline-geometric restraint may comprise a first strap having a first end and a second end opposite the first end, a second strap coupled to the first strap, and a first restraint pin coupled to the second strap. A length of the second strap may be less than a length of the first strap.

In various embodiments, a cover may be located over the first restraint pin. In various embodiments, a third strap may be coupled to the first strap. A length of the third strap may be less than the length of the first strap. A second restraint pin may be coupled to the third strap.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
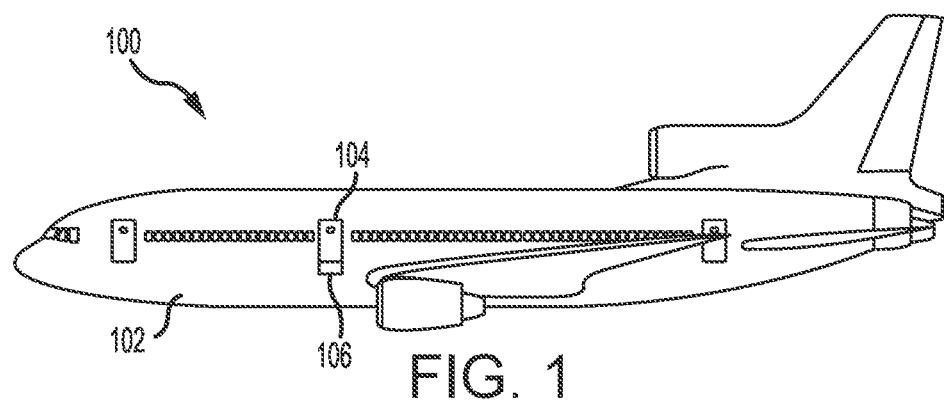
FIG. 1 illustrates an aircraft having an evacuation system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements.

Accordingly, elements with like element numbering may be shown in the figures, but may not be necessarily be repeated herein for the sake of clarity.

Evacuation slides according to the present disclosure may include a lifeline-geometric restraint. In accordance with various embodiments, the lifeline-geometric restraint may regulate the deployment sequence and characteristics of the evacuation slide. The lifeline-geometric restraint is located along the evacuation slide such that, in the event of a water landing, the lifeline-geometric restraint can be grasped by persons in the water.

With reference to FIG. 1, an exemplary aircraft 100 is shown, in accordance with various embodiments. Aircraft 100 may comprise a fuselage 102 having plurality of exit doors, including an exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member such as depression of a button or actuation of a lever.

Figure 2A:
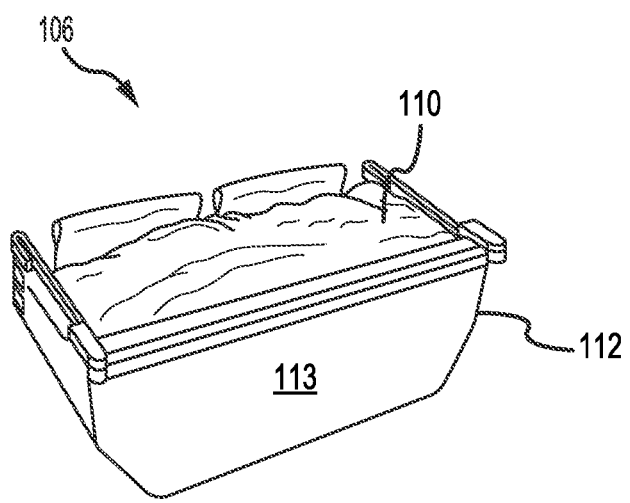
FIG. 2A illustrates a perspective view of an evacuation slide in a stowed position, in accordance with various embodiments.

With reference to FIG. 2A, and continuing reference to FIG. 1, an evacuation slide 110 of evacuation assembly 106 is illustrated in a stowed and/or packed position. In various embodiments, evacuation slide 110 may be stowed in a packboard 112. Evacuation slide 110 may be folded when in the stowed position. In various embodiments, evacuation slide 110 may be deployed from packboard 112 in response to opening exit door 104. Packboard 112 may include a blow-out panel 113 that opens in response to deployment of evacuation slide 110 and through which evacuation slide 110 exits the packboard 112.

Figure 2B:
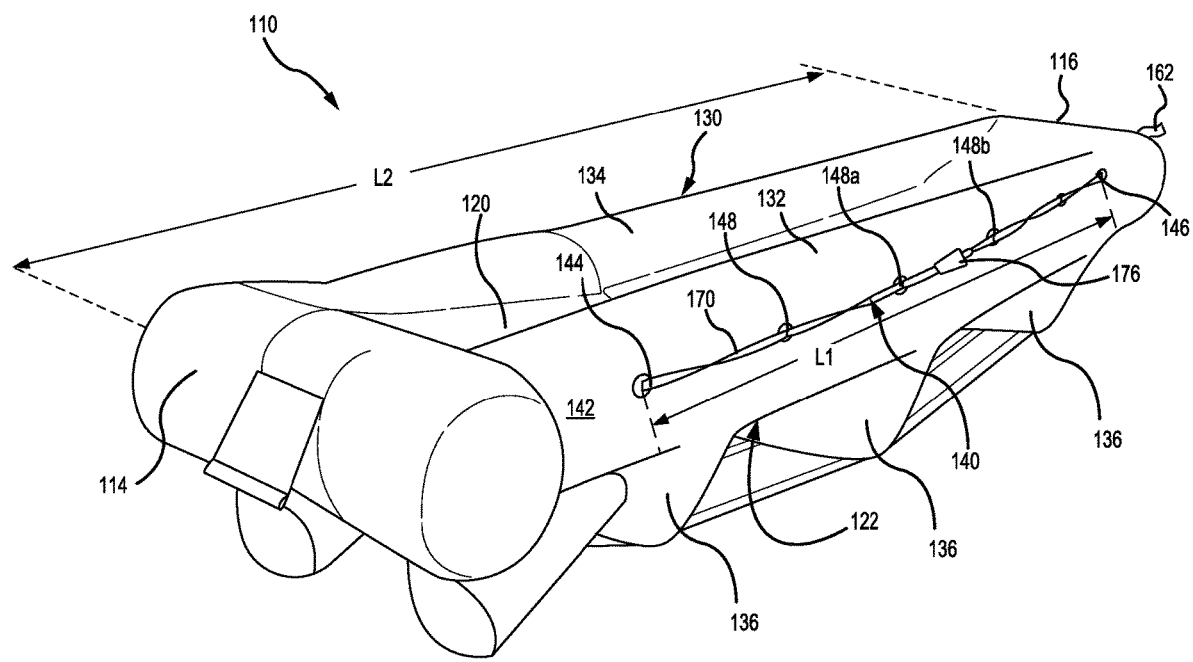
FIG. 2B illustrates a perspective view of an evacuation slide in a deployed position and including a lifeline-geometric restraint, in accordance with various embodiments.

With reference to FIG. 2B, evacuation slide 110 is illustrated in an inflated or "deployed" position. In accordance with various embodiments, evacuation slide 110 includes a head end 114 and a toe end 116 opposite head end 114. Head end 114 may be coupled to an aircraft structure (e.g., fuselage 102 in FIG. 1). In accordance with various embodiments, evacuation slide 110 is an inflatable slide. Evacuation slide 110 includes a sliding surface 120 and an underside surface 122 opposite sliding surface 120. Sliding surface 120 extends from head end 114 to toe end 116. In response to an evacuation event (i.e., to deployment of evacuation slide 110), underside surface 122 may be oriented toward an exit surface (e.g., toward the ground or toward a body of water). While evacuation slide 110 is illustrated as a single lane slide, it is contemplated and understood that evacuation slide 110 may include any number of lanes.

Evacuation slide 110 includes a slide rail structure 130. In accordance with various embodiments, slide rail structure 130 includes a first inflatable side rail 132 and a second inflatable side rail 134. First and second inflatable slide rails 132, 134 extend between head end 114 and toe end 116. First inflatable side rail 132 is located at a first side of sliding surface 120. Second inflatable side rail 134 is located at a second side of sliding surface 120 opposite the first side. In various embodiments, evacuation slide 110 may include one or more transverse tubes 136 located on underside surface 122 and extending between first inflatable side rail 132 and second inflatable slide rail 134. In the event of a water landing, transverse tubes 136 may be located in the water, upon release of evacuation slide 110 from aircraft 100.

In accordance with various embodiments, evacuation slide 110 includes a lifeline-geometric restraint 140. In various embodiments, lifeline-geometric restraint 140 is coupled to a distal surface 142 of first inflatable side rail 132. Distal surface 142 of first inflatable side rail 132 is oriented generally away from second inflatable side rail 134. In various embodiments, a lifeline-geometric restraint similar to lifeline-geometric restraint 140 may be coupled to a distal surface of second inflatable side rail 134, where the distal surface of second inflatable side rail 134 is oriented away from first inflatable side rail 132.

In various embodiments, a first end 144 of lifeline-geometric restraint 140 is coupled to evacuation slide 110 proximate head end 114 and a second end 146 of lifeline-geometric restraint 140 is coupled to evacuation slide 110 proximate toe end 116. In this regard, first end 144 may be located closer to head end 114 than to a slide midpoint (i.e., than to a point on first inflatable side rail 132 that is halfway between head end 114 and toe end 116), and second end 146 may be located closer to toe end 116 than to the slide midpoint. In various embodiments, lifeline-geometric restraint 140 is coupled to first inflatable side rail 132 at one or more locations between first end 144 and second end 146. For example, lifeline-geometric restraint 140 may be coupled to first inflatable side rail 132 at attachment points 148, 148a, and 148b. Lifeline-geometric restraint 140 may be coupled to first inflatable side rail 132 via sewing, adhesive, fasteners, or any other suitable attachment technique.

In various embodiments, a length L1 of lifeline-geometric restraint 140, as measured from first end 144 to second end 146, is between 50% and 100% of a length L2 of evacuation slide 110, as measured from head end 114 to toe end 116. For example, in various embodiments, length L1 of lifeline-geometric restraint 140 may be at least 80% of length L2 of evacuation slide 110.

A location of lifeline-geometric restraint 140 is selected such that, in the event of a water landing, lifeline-geometric restraint 140 will be accessible to persons who have fallen in the water. In this regard, lifeline-geometric restraint 140 is configured such that it will be located out of the water when evacuation slide 110 is uncoupled from the aircraft and such that it can be grasped by a hand. For example, lifeline-geometric restraint 140 is coupled to first inflatable side rail 132 such that there is space between distal surface 142 and the portions of lifeline-geometric restraint 140 extending between attachment points 148, 148a, and 148b and first and second ends 144, 146. Stated differently, the locations of attachment points 148 and/or the tautness of lifeline-geometric restraint 140 is/are selected such that a person can locate his/her hand between distal surface 142 and lifeline-geometric restraint 140.

In accordance with various embodiments, lifeline-geometric restraint 140 is also configured to serve as a geometric restraint that regulates the deployment sequence and characteristics of evacuation slide 110.

Figure 3A:
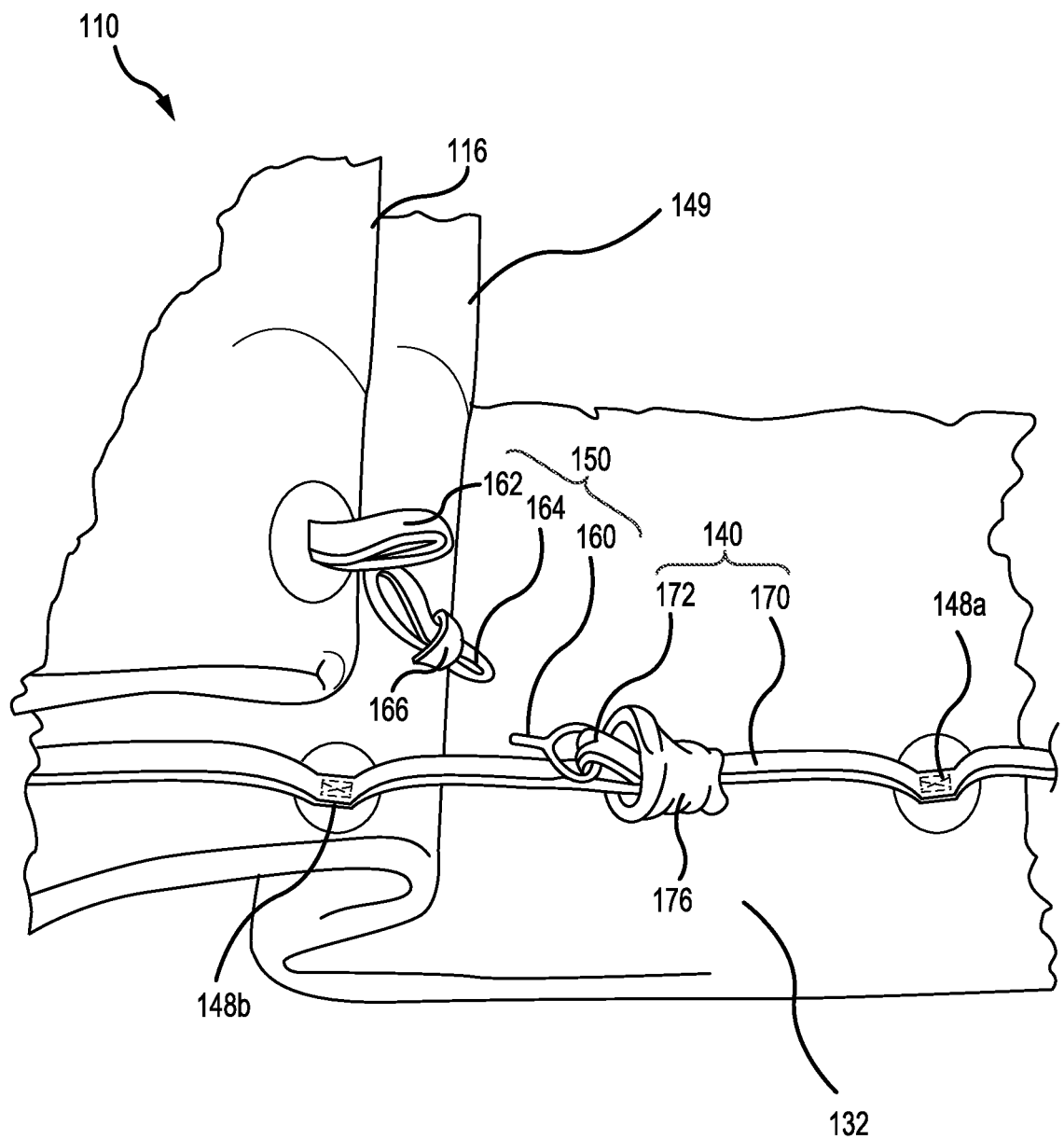
FIGS. 3A and 3B illustrate a releasable restraint assembly for aiding in a staged deployment of an evacuation slide, in accordance with various embodiments.

With reference to FIG. 3A, evacuation slide 110 is illustrated in a folded or stowed position, in accordance with various embodiments. When evacuation slide 110 is in the folded position, evacuation slide 110 may include one or more folds 149. A releasable restraint assembly 150 may aid in maintaining folds 149 and in a staged deployment of evacuation slide 110. In FIG. 3A, releasable restraint assembly 150 is shown in an unsecured position.

In accordance with various embodiment, releasable restraint assembly 150 may include a restraint pin 160 and one or more loops, such as first loop 162 and second loop 164, coupled to evacuation slide 110. Releasable restraint assembly 150 is configured such that evacuation slide 110 is maintained in the folded position when restraint pin 160 is engaged with (i.e., located in) first and/or second loops 162, 164. In this regard, evacuation slide 110 may unfold in response to restraint pin 160 disengaging from (i.e., translating out) first and/or second loops 162,164.

In various embodiments, first loop 162 may be coupled to toe end 116 of evacuation slide 110. First loop 162 may be coupled to evacuation slide 110 via sewing, adhesive, fasteners, or any other suitable attachment technique. In various embodiments, second loop 164 may be coupled to evacuation slide 110 via an attachment loop 166 coupled to evacuation slide 110. For example, second loop 164 may be coupled to evacuation slide 110 by locating second loop 164 through attachment loop 166. First loop, 162, second loop 164, and/or attachment loop 166 may each comprise rope, tape, ribbon, webbing, or other suitable material.

In accordance with various embodiments, restraint pin 160 is coupled to lifeline-geometric restraint 140. In various embodiments, lifeline-geometric restraint 140 may include a first strap 170 and a second strap 172. First strap 170 may include first and second ends 144, 146 of lifeline-geometric restraint 140, with momentary reference to FIG. 2B. Second strap 172 may be sewn to first strap 170. In accordance with various embodiments, restraint pin 160 may be coupled to second strap 172. A length of second strap 172 is less than the length L1 of first strap 170. In various embodiments, second strap 172 is coupled (e.g., sewn) to first strap 170 between a first attachment point 148a and a second attachment point 148b. In various embodiments, the length of second strap 172, as measured from restraint pin 160 to first strap 170, is less than the length of first strap 170, as measured between first attachment point 148a and second attachment point 148b. First and second straps 170, 172 may each comprise rope, tape, ribbon, webbing, or other suitable strap. In various embodiments, first and second straps 170, 172 may comprise nylon, ballistic nylon, polypropylene, polyester, cotton, or other suitable material.

Figure 5A:
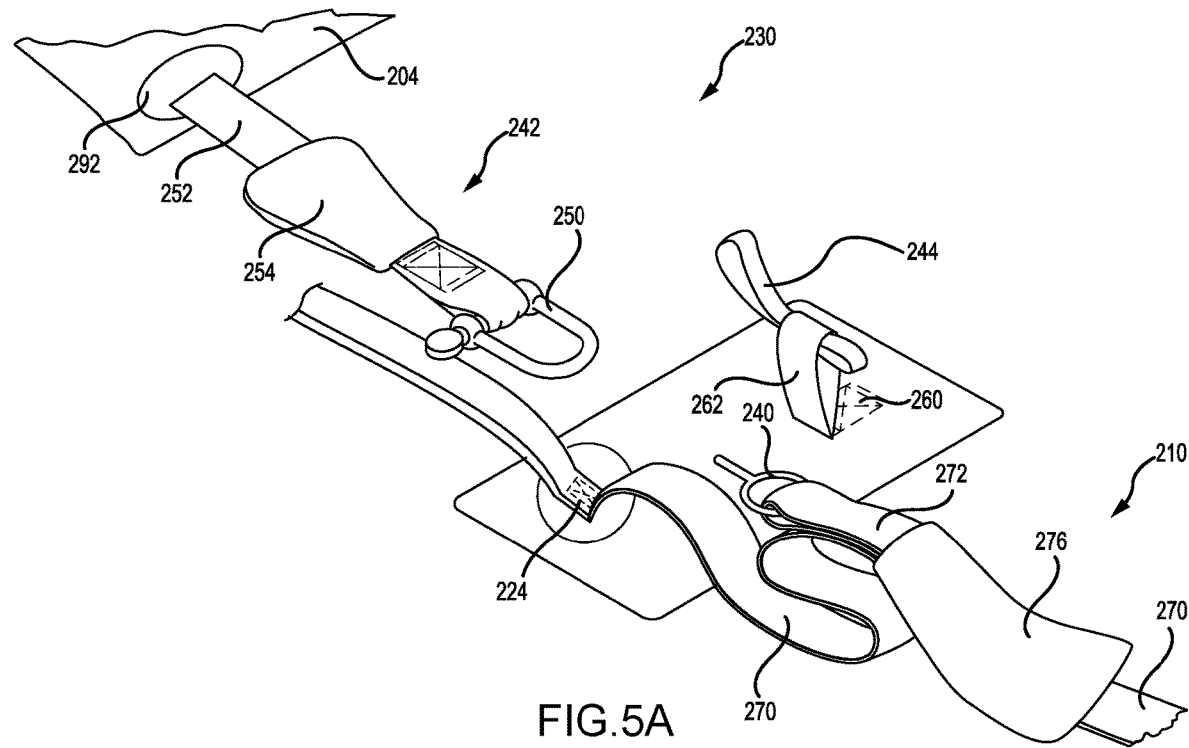
FIGS. 5A, 5B, and 5C illustrate releasable restraint assemblies for aiding in the staged deployment of an evacuation slide, in accordance with various embodiments.

In various embodiments, lifeline-geometric restraint 140 may include a cover 176. Cover 176 may be configured to be located over and/or to surround restraint pin 160. In FIG. 5A cover 176 is shown as pulled back or away from restraint pin 160 to illustrate the features of restraint pin 160. Cover 176 may comprise a fabric. For example, cover 176 may comprise nylon, ballistic nylon, polypropylene, polyester, cotton, or other suitable material.

Figure 3B:
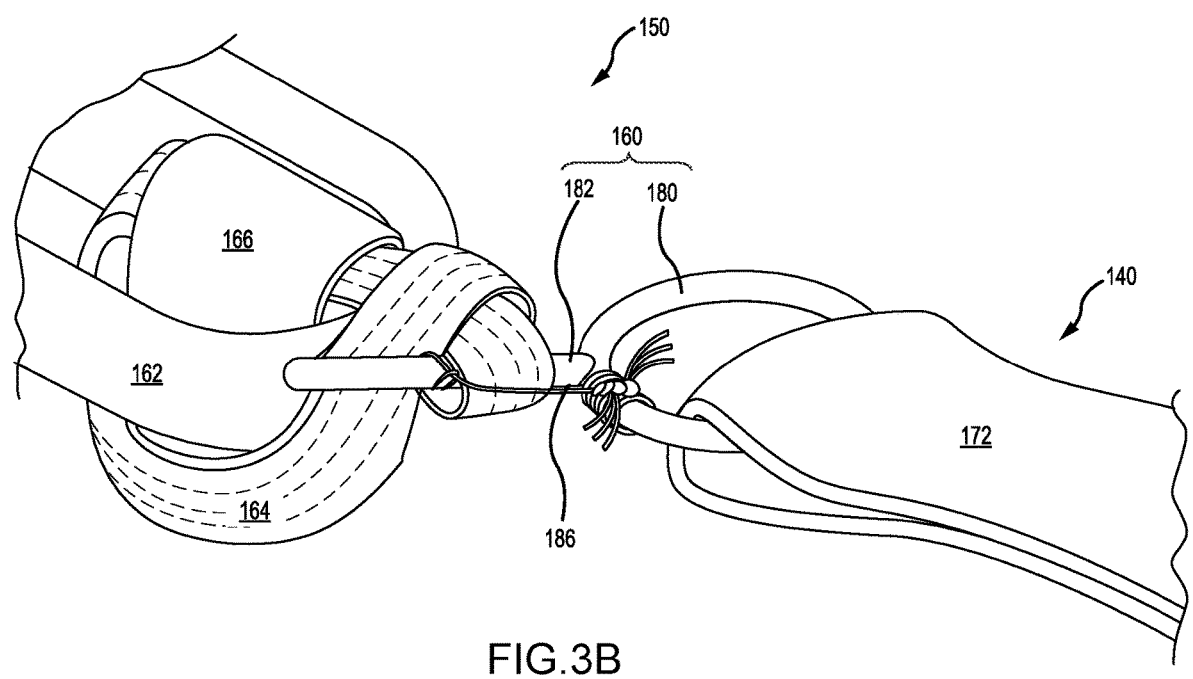

With reference to FIG. 3B, releasable restraint assembly 150 is illustrated in a secured position. In accordance with various embodiments, first loop 162 may be secured to second strap 172 of lifeline-geometric restraint 140 by locating second loop 164 through first loop 162 and locating restraint pin 160 through second loop 164. Locating restraint pin 160 through second loop 164 tends to prevent or block first loop 162 from separating or decoupling from second loop 164 and lifeline-geometric restraint 140. In this regard, coupling first loop 162 to lifeline-geometric restraint 140, via second loop 164 and restraint pin 160, tends to maintain evacuation slide 110 in the folded position.

With combined reference to FIGS. 3A and 3B, in accordance with various embodiments, restraint pin 160 is configured to translate out second loop 164, in response to an internal pressure in evacuation slide 110 exceeding a predetermined threshold pressure. For example, in response to evacuation slide 110 being deployed, a gas cylinder may supply a flow of pressurized fluid to evacuation slide 110, and evacuation slide 110 may begin to inflate and an internal pressure of evacuation slide 110 may increase. Releasable restraint assembly 150 may maintain evacuation slide 110 in the folded position until the internal pressure of evacuation slide 110 has increased above the predetermined threshold pressure. Restraint pin 160 may translate out second loop 164 once the internal pressure of evacuation slide 110 has increased above the predetermined threshold pressure, thereby allowing first loop 162 to separate from second loop 164. Evacuation slide 110 may unfold (i.e., toe end 116 may translate away from second strap 172 of lifeline-geometric restraint 140) in response to restraint pin 160 translating out second loop 164.

In various embodiments, restraint pin 160 may include a ring 180 and a shaft 182 extending from the ring 180. Shaft 182 may be located through second loop 164. In various embodiments, a string 186 may be coupled to ring 180 and shaft 182. String 186 may be attached to restraint pin 160, after locating shaft 182 through second loop 164. String 186 may be attached to restraint pin 160 such that second loop 164 is located between ring 180 and the portion of string 186 that is coupled to shaft 182. Coupling string 186 to shaft 182 and ring 180 tends to prevent or reduce occurrences of restraint pin 160 translating out second loop 164 prior to the internal pressure of evacuation slide 110 exceeding the predetermined threshold pressure. In accordance with various embodiments, string 186 is configured to sever in response to the force generated by translation of restraint pin 160 during deployment of evacuation slide 110. Stated differently, during deployment, the force generated by internal pressure of evacuation slide 110 causes restraint pin 160 and second strap 172 to translate away from second loop 164 and toe 116, thereby severing string 186.

Figure 4:
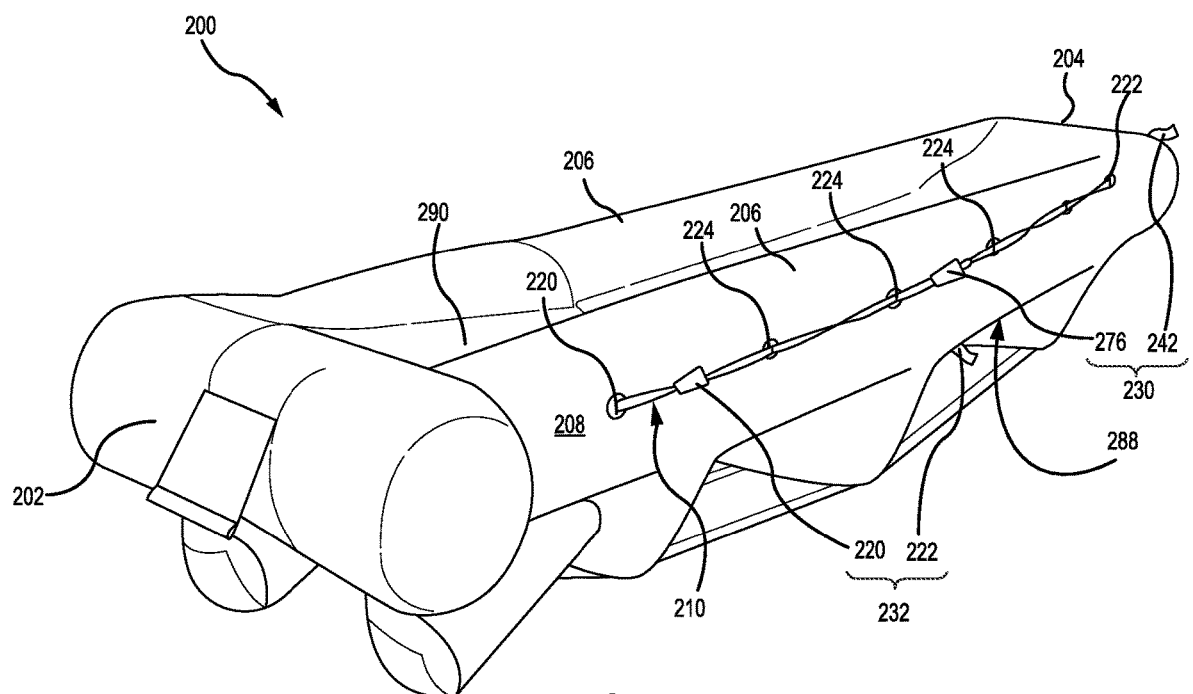
FIG. 4 illustrates an evacuation slide in a deployed position and including a lifeline-geometric restraint, in accordance with various embodiments.

With reference to FIG. 4, an evacuation slide 200 is illustrated in the deployed position. In accordance with various embodiments, evacuation assembly 106, with momentary reference to FIG. 1, may include evacuation slide 200 in place of evacuation slide 110. Evacuation slide 200 may be similar to evacuation slide 110 in FIG. 2B. Evacuation slide 200 includes a head end 202, a toe end 204, and inflatable side rails 206.

In accordance with various embodiments, evacuation slide 200 includes a lifeline-geometric restraint 210. Lifeline-geometric restraint 210 is coupled to a distal surface 208 of inflatable side rail 206. A first end 220 of lifeline-geometric restraint 210 is coupled to evacuation slide 200 proximate head end 202 and a second end 222 of lifeline-geometric restraint 210 is coupled to evacuation slide 200 proximate toe end 204. In this regard, first end 220 may be located closer to head end 202 than to a slide midpoint (i.e., than to a point on inflatable side rail 206 that is halfway between head end 202 and toe end 204), and second end 222 may be located closer to toe end 204 than to the slide midpoint. In various embodiments, lifeline-geometric restraint 210 is coupled to inflatable side rail 206 at one or more locations between first end 220 and second end 222. For example, lifeline-geometric restraint 210 may be coupled to inflatable side rail 206 at attachment points 224. Lifeline-geometric restraint 210 may be coupled to inflatable side rail 206 via sewing, adhesive, fasteners, or any other suitable attachment technique.

In various embodiments, a length of lifeline-geometric restraint 210, as measured from first end 220 to second end 222, is between 50% and 100% of a length of evacuation slide 200, as measured from head end 202 to toe end 204. In various embodiments, the length of lifeline-geometric restraint 210 may be at least 80% of the length of evacuation slide 200.

A location of lifeline-geometric restraint 210 is selected such that, in the event of a water landing, lifeline-geometric restraint 210 will be accessible to persons located in the water. In accordance with various embodiments, lifeline-geometric restraint 210 is also configured to serve as a geometric restraint that regulates the deployment sequence and characteristics of evacuation slide 200.

Evacuation slide 200 may include one or more releasable restraint assemblies, including a first releasable restraint assembly 230 and a second releasable restraint assembly 232. First and second releasable restraint assemblies 230, 232 may aid in maintaining evacuation slide 200 in a folded position and in a staged deployment of evacuation slide 200.

Figure 5B:
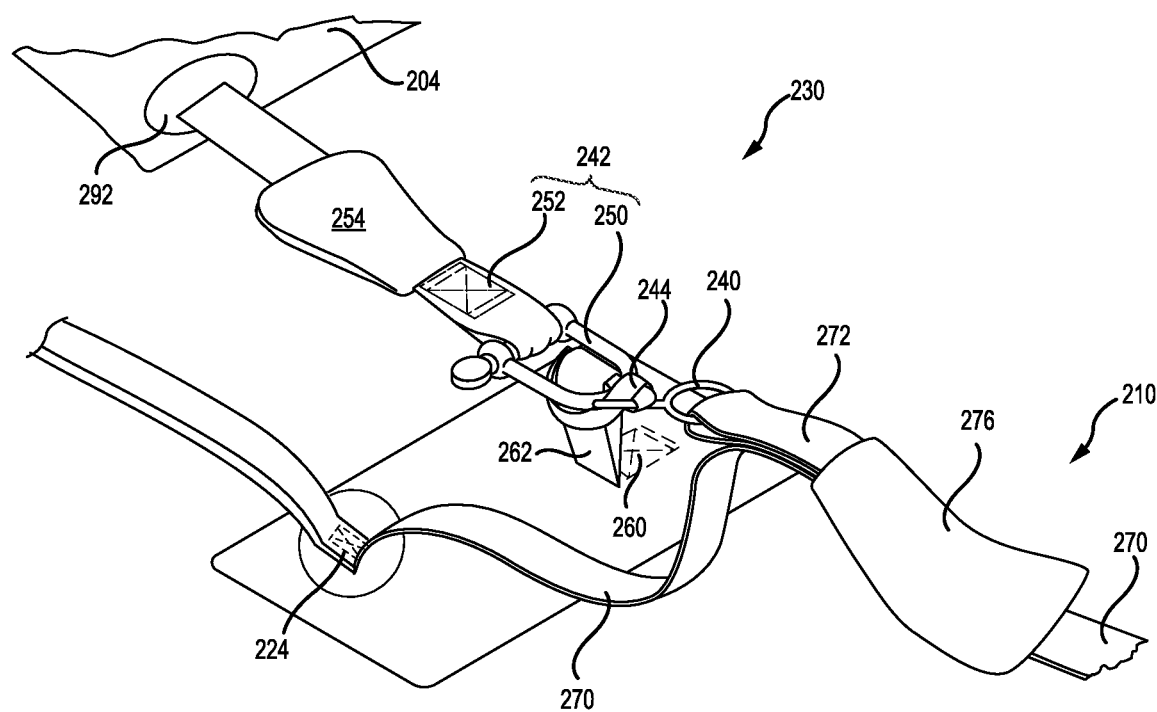

With reference to FIG. 5A, first releasable restraint assembly 230 is shown in an unsecured position. In accordance with various embodiment, first releasable restraint assembly 230 may include a first restraint pin 240 and one or more loops, such as first loop 242 and second loop 244, coupled to evacuation slide 200. First loop 242 may be coupled to toe end 204. In various embodiments, first loop 242 includes a bracket 250 coupled to an attachment location 292 via a strap 252. In various embodiments, attachment location 292 may be located at toe end 204 of evacuation slide 200. A cover 254 may be located over bracket 250. In FIGS. 5A and 5B, cover 254 is shown as pulled back or away from bracket 250 to better illustrate the features of bracket 250. Cover 254 may comprise a fabric. For example, cover 254 may comprise nylon, ballistic nylon, polypropylene, polyester, cotton, or other suitable material.

In various embodiments, second loop 244 may be coupled to a location 260 on evacuation slide 200. Second loop 244 may be coupled to location 260 via an attachment loop 262 coupled to location 260. For example, second loop 244 may be coupled to evacuation slide 200 by locating second loop 244 through attachment loop 262.

In accordance with various embodiments, first restraint pin 240 is coupled to lifeline-geometric restraint 210. In various embodiments, lifeline-geometric restraint 210 may include a first strap 270 and a second strap 272. First strap 270 may include first and second ends 220, 222 of lifeline-geometric restraint 210, with momentary reference to FIG. 4. Second strap 272 may be sewn to first strap 270. In accordance with various embodiments, first restraint pin 240 may be coupled to second strap 272. In various embodiments, lifeline-geometric restraint 210 may include a first cover 276. First cover 276 may be configured to be located over and/or to surround first restraint pin 240. In FIGS. 5A and 5B, cover 276 is shown as pulled back or away from first restraint pin 240 to better illustrate the features of first restraint pin 240.

With reference to FIG. 5B, first releasable restraint assembly 230 is illustrated in a secured position. In accordance with various embodiments, first loop 242 may be secured to second strap 272 of lifeline-geometric restraint 210 by locating second loop 244 through bracket 250 and locating first restraint pin 240 through second loop 244. Locating first restraint pin 240 through second loop 244 tends to prevent or block bracket 250 of first loop 242 from separating or decoupling from second loop 244 and lifeline-geometric restraint 210. In this regard, coupling bracket 250 of first loop 242 to lifeline-geometric restraint 210, via second loop 244 and first restraint pin 240, tends to maintain toe end 204 proximate location 260 and lifeline-geometric restraint 210. Stated differently, coupling bracket 250 of first loop 242 to lifeline-geometric restraint 210, via second loop 244 and first restraint pin 240, tends to maintain evacuation slide 200 in the folded position.

Figure 5C:
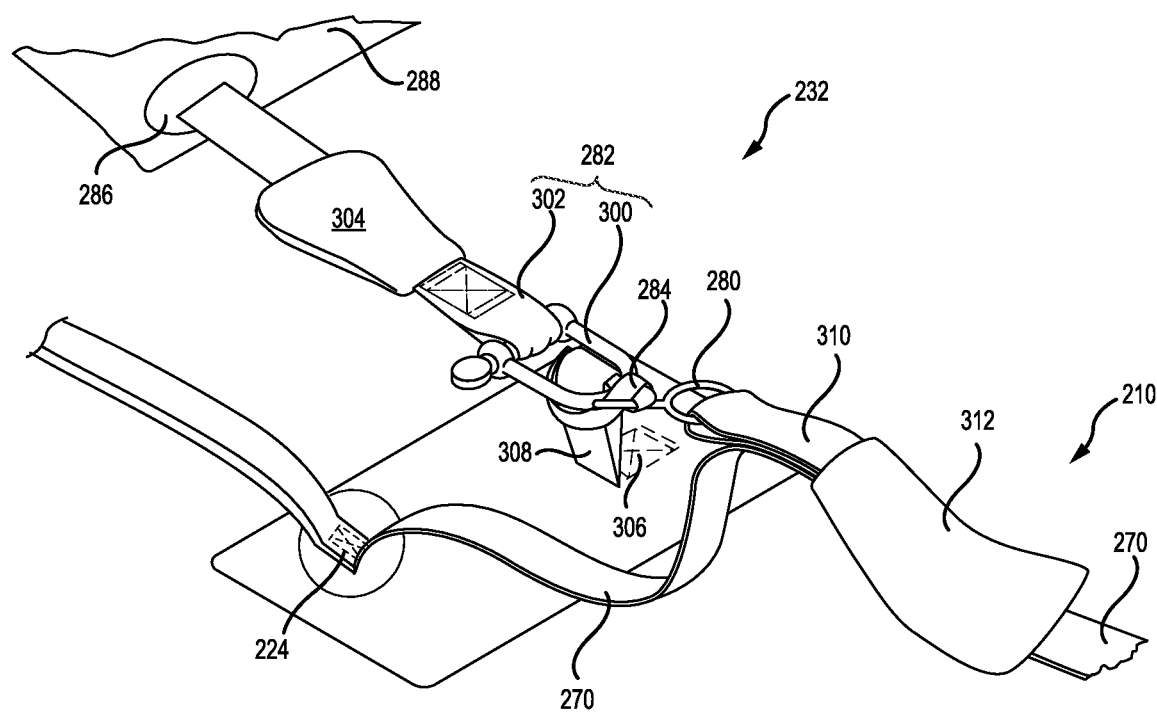

With reference to FIG. 5C, second releasable restraint assembly 232 is shown in a secured position. In accordance with various embodiment, second releasable restraint assembly 232 may include a second restraint pin 280 and one or more loops, such as third loop 282 and fourth loop 284, coupled to evacuation slide 200. Third loop 282 may be coupled to a location 286 on evacuation slide 200. In various embodiment, location 286 may be on an underside 288 of evacuation slide 200, with momentary reference to FIG. 4 (i.e., location 286 may be on a surface opposite a sliding surface 290 of evacuation slide 200). In various embodiments, location 286 is located closer to head end 202, as compared to attachment location 292 of first loop 242 in FIG. 5B.

In various embodiments, third loop 282 includes a bracket 300 coupled to attachment location 286 via a strap 302. A cover 304 may be located over bracket 300. In FIG. 5C, cover 304 is shown as pulled back or away from bracket 300 to better illustrate the features of bracket 350. Cover 304 may comprise a fabric. For example, cover 304 may comprise nylon, ballistic nylon, polypropylene, polyester, cotton, or other suitable material.

In various embodiments, fourth loop 284 may be coupled to a location 306 on evacuation slide 200. Location 306 may be different from location 260 in FIG. 5B. For example, location 306 may be closer to head end 202 as compared to location 260. In various embodiments, location 306 may be closer to toe end 204 as compared to location 260. Fourth loop 284 may be coupled to location 306 via an attachment loop 308 coupled to location 306. For example, fourth loop 284 may be coupled to evacuation slide 200 by locating fourth loop 284 through attachment loop 308.

In accordance with various embodiments, second restraint pin 280 is coupled to lifeline-geometric restraint 210. In various embodiments, lifeline-geometric restraint 210 may include a third strap 310. Third strap 310 may be coupled (e.g., sewn) to first strap 270. In accordance with various embodiments, second restraint pin 280 may be coupled to third strap 310 of lifeline-geometric restraint 210. In various embodiments, lifeline-geometric restraint 210 may include a second cover 312. Second cover 312 may be configured to be located over and/or to surround second restraint pin 280. In FIG. 5C, second cover 312 is shown as pulled back or away from second restraint pin 280 to better illustrate the features of second restraint pin 280.

In accordance with various embodiments, third loop 282 may be secured to third strap 310 of lifeline-geometric restraint 210 by locating fourth loop 284 through bracket 300 and locating second restraint pin 280 through fourth loop 284. Locating second restraint pin 280 through fourth loop 284 tends to prevent or block bracket 300 of third loop 282 from separating or decoupling from fourth loop 284 and lifeline-geometric restraint 210. In this regard, coupling bracket 300 of third loop 282 to lifeline-geometric restraint 210, via fourth loop 284 and second restraint pin 280, tends to maintain location 286 proximate location 306 and lifeline-geometric restraint 210. Stated differently, coupling bracket 300 of third loop 282 to lifeline-geometric restraint 210, via fourth loop 284 and second restraint pin 280, tends to maintain evacuation slide 200 in the folded position.

With combined reference to FIGS. 5A, 5B, and 5C, in accordance with various embodiments, first restraint pin 240 is configured to translate out second loop 244 in response to an internal pressure in evacuation slide 200 exceeding a first predetermined threshold pressure. Second restraint pin 280 is configured to translate out fourth loop 284 in response to an internal pressure in evacuation slide 200 exceeding a second predetermined threshold pressure different from the first predetermined threshold pressure. In various embodiments, the second predetermined threshold pressure may be less than the first predetermined threshold pressure. In this regard, second restraint pin 280 may be configured to translate out fourth loop 284 prior to first restraint pin 240 translating out second loop 244. Evacuation slide 200 may unfold in response to first restraint pin 240 and second restraint pin 280 translating out second loop 244 and fourth loop 284, respectively. In this regard, first releasable restraint assembly 230 and second releasable restraint assembly 232, including first and second restraint pins 240, 280 coupled to lifeline-geometric restraint 210, aid in staged deployment of evacuation slide 200.

While evacuation slide 200 is illustrated with two releasable restraint assemblies, it is further contemplated and understood that evacuation slide 200 may include any number of releasable restraint assemblies. In this regard, any number of restraint pins may be coupled to lifeline-geometric restraint 210.

Figure 6A:
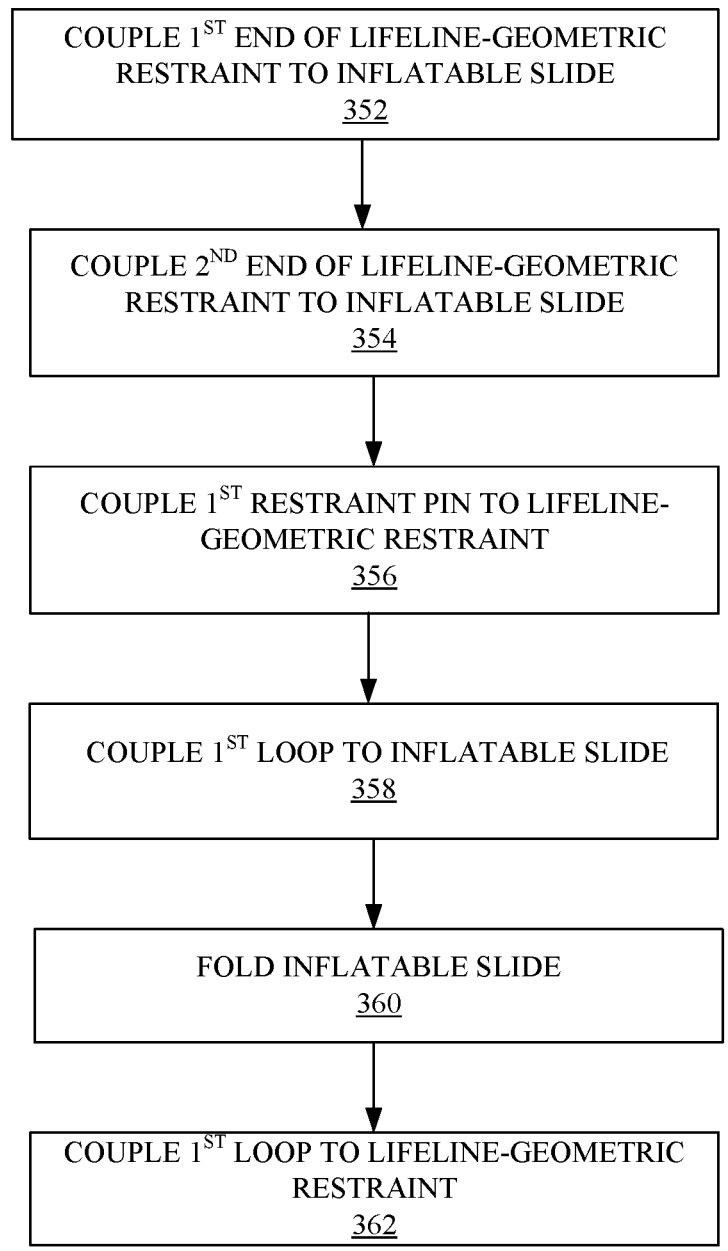
FIGS. 6A, 6B, 6C, and 6D illustrate a method of assembling an evacuation assembly, in accordance with various embodiments.
Figure 6B:
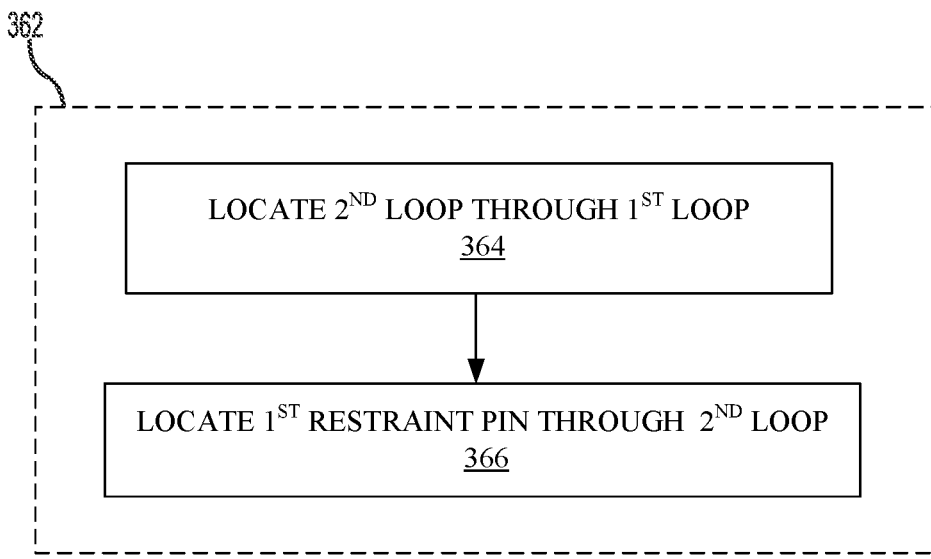

With reference to FIG. 6A, a method 350 of assembling an evacuation assembly is illustrated. In accordance with various embodiments, method 350 may include coupling a first end of a lifeline-geometric restraint to an inflatable slide (step 352), coupling a second end of the lifeline-geometric restraint to the inflatable slide (step 354), coupling a first restraint pin to the lifeline-geometric restraint (step 356), coupling a first loop to the inflatable slide (step 358), folding the inflatable slide (step 360), and coupling the first loop to the lifeline-geometric restraint (step 362). With reference to FIG. 6B, step 362 may include locating a second loop through the first loop (step 364) and locating the first restraint pin through the second loop (step 366).

Figure 6D:
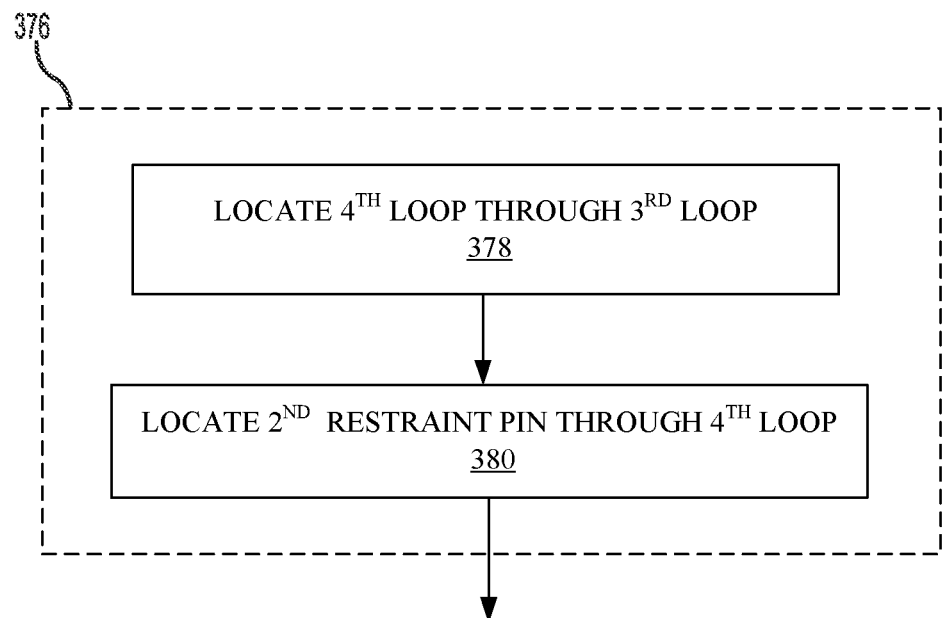
Figure 6C:
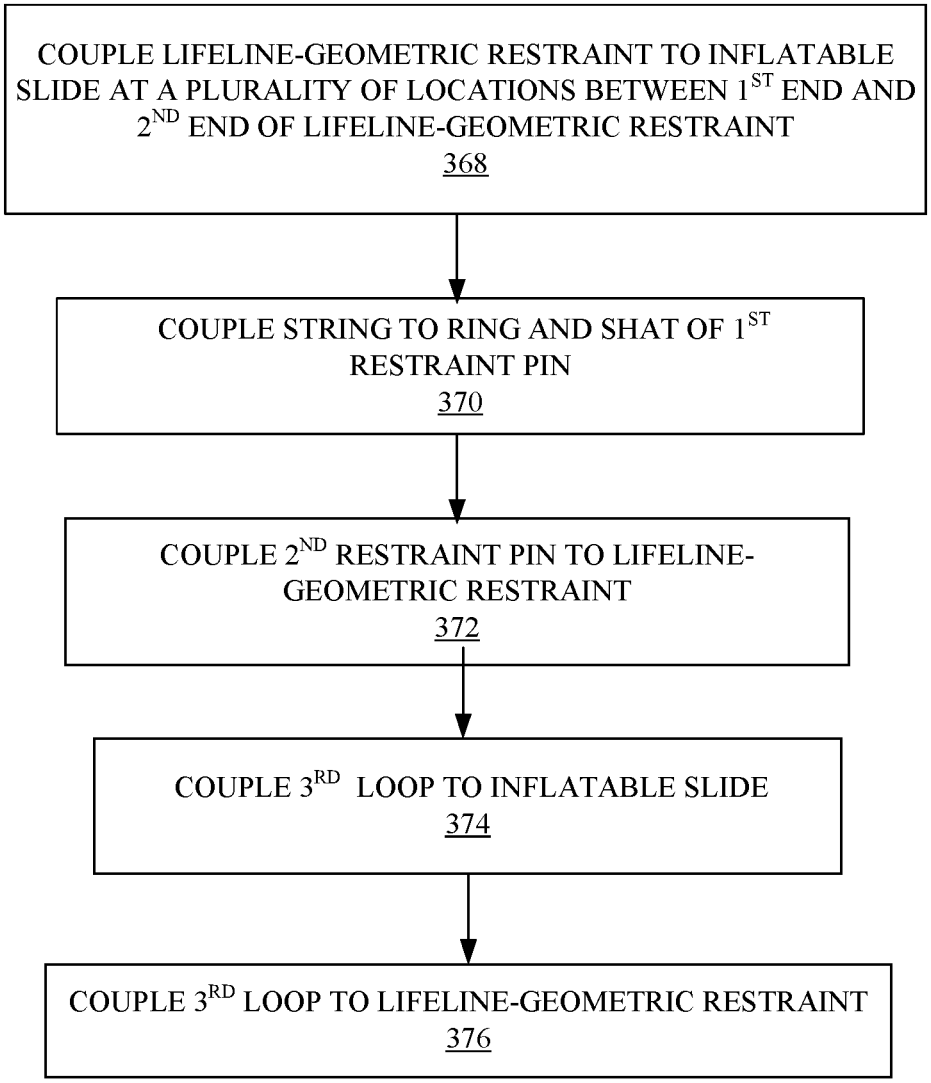

With reference to FIG. 6C, in various embodiments, method 350 may further comprise coupling the lifeline-geometric restraint to the inflatable slide at a plurality of locations between the first end of the lifeline-geometric restraint and the second end of the lifeline-geometric restraint (step 368). In various embodiments, method 350 may further comprise coupling a string to a ring of the first restraint pin and to a shaft of the first restraint pin (step 370). In various embodiments, method 350 may further include coupling a second restraint pin to the lifeline-geometric restraint (step 372), coupling a third loop to the inflatable slide (step 374), and coupling the third loop to the lifeline-geometric restraint (step 376). In various embodiments, and with reference to FIG. 6D, step 376 may include locating a fourth loop through the third loop (step 378) and locating the second restraint pin through the fourth loop (step 380). In various embodiments, method 350 may further include configuring the first restraint pin to translate out the second loop in response to an internal pressure of the inflatable slide exceeding a first predetermined internal pressure and configuring the second restraint pin to translate out the fourth loop in response to the internal pressure of the inflatable slide exceeding a second predetermined internal pressure (step 382). In various embodiments, the first predetermined internal pressure may be less than the second predetermined internal pressure. In various embodiments, the third loop may be located closer to a head end of the inflatable slide as compared to the first loop.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
an inflatable side rail extending from a head end of the evacuation slide to a toe end of the evacuation slide;
a lifeline-geometric restraint coupled to the inflatable side rail;
a first restraint pin coupled to the lifeline-geometric restraint;
a first loop coupled to a first location on the evacuation slide; and
a second loop coupled to a second location on the evacuation slide, wherein the first loop is configured to receive the second loop and the second loop is configured to receive the first restraint pin when the evacuation slide is in a folded position, and wherein the first restraint pin is configured to translate out the second loop in response to an internal pressure of the evacuation slide exceeding a first predetermined internal pressure.

2. The evacuation slide of claim 1, wherein a length of the lifeline-geometric restraint is at least 80% of a length of the evacuation slide, the length of the evacuation slide being measured from the head end of the evacuation slide to the toe end of the evacuation slide.

3. The evacuation slide of claim 2, wherein the lifeline-geometric restraint includes a first strap including a first end coupled to the inflatable side rail proximate the head end of the evacuation slide and a second end opposite the first end coupled to the inflatable side rail proximate the toe end of the evacuation slide.

4. The evacuation slide of claim 3, wherein the lifeline-geometric restraint includes a second strap extending from the first strap, and wherein the first restraint pin is coupled to the second strap.

5. The evacuation slide of claim 4, wherein the first strap is coupled to the inflatable side rail at a plurality of locations between the first end and the second end of the first strap.

6. The evacuation slide of claim 1, wherein the first loop is coupled to the toe end of the evacuation slide.

7. The evacuation slide of claim 1, wherein the lifeline-geometric restraint further includes a cover located over the first restraint pin.

8. The evacuation slide of claim 1, further comprising:
a second restraint pin coupled to the lifeline-geometric restraint;
a third loop coupled to a third location on the evacuation slide, the third location being closer to the head end of the evacuation slide as compared to the first location; and
a fourth loop coupled to a fourth location on the evacuation slide, wherein the third loop is configured to receive the fourth loop and the fourth loop is configured to receive the second restraint pin when the evacuation slide is in the folded position, and wherein the second restraint pin is configured to translate out the fourth loop in response to the internal pressure of the evacuation slide exceeding a second predetermined internal pressure, different from the first predetermined internal pressure.

9. The evacuation slide of claim 8, wherein the second predetermined internal pressure is less than the first predetermined internal pressure.

10. A method of assembling an evacuation assembly, comprising coupling a first end of a lifeline-geometric restraint to an inflatable slide;
coupling a second end of the lifeline-geometric restraint to the inflatable slide;
coupling a first restraint pin to the lifeline-geometric restraint;
coupling a first loop to the inflatable slide;
folding the inflatable slide; and
coupling the first loop to the lifeline-geometric restraint by:
locating a second loop through the first loop; and
locating the first restraint pin through the second loop.

11. The method of claim 10, further comprising configuring the first restraint pin to translate out the second loop in response to an internal pressure of the inflatable slide exceeding a first predetermined internal pressure.

12. The method of claim 11, further comprising coupling a string to a ring of the first restraint pin and to a shaft of the first restraint pin.

13. The method of claim 11, further comprising:
coupling a second restraint pin to the lifeline-geometric restraint;
coupling a third loop to the inflatable slide; and
coupling the third loop to the lifeline-geometric restraint by:
locating a fourth loop through the third loop; and
locating the second restraint pin through the second loop.

14. The method of claim 13, further comprising configuring the second restraint pin to translate out the fourth loop in response to the internal pressure of the inflatable slide exceeding a second predetermined internal pressure less than the first predetermined internal pressure.

15. The method of claim 14, wherein the third loop is located closer to a head end of the inflatable slide as compared to the first loop.

16. The method of claim 11, wherein a length of the lifeline-geometric restraint is at least 80% of a length of the inflatable slide, the length of the lifeline-geometric restraint being measured from the first end of the lifeline-geometric restraint to the second end of the lifeline-geometric restraint, the length of the inflatable slide being measured from a head end of the inflatable slide to a toe end of the inflatable slide.

17. The method of claim 16, further comprising coupling the lifeline-geometric restraint to the inflatable slide at a plurality of locations between the first end of the lifeline-geometric restraint and the second end of the lifeline-geometric restraint.

18. A lifeline-geometric restraint for an inflatable slide, the lifeline-geometric restraint comprising:
a first strap having a first end and a second end opposite the first end;
a second strap sewn to the first strap, wherein a length of the second strap is less than a length of the first strap, the length of the first strap being measured between the first end of the first strap and the second end of the first strap;
a first releasable restraint coupled to the second strap, wherein a first portion of the first releasable restraint is located through a loop formed by the second strap, and wherein the first portion of the first releasable restraint is configured to separate from a second portion of the first releasable restraint in response to translation of the second strap away from the second portion of the first releasable restraint; and
a fabric cover configured to surround the first portion of the first releasable restraint.

19. The lifeline-geometric restraint of claim 18, wherein the first portion of the first releasable restrain comprises a restraint pin, the restraint pin including a ring and a shaft extending from the ring.

20. The lifeline-geometric restraint of claim 19, further comprising:
a third strap coupled to the first strap, wherein the third strap is sewn to the first strap between the second strap and the first end of the first strap, and wherein a length of the third strap is less than the length of the first strap; and
a second releasable restrain coupled to the third strap.

* * * * *

UNITED STATES PATENT AND TRADEMARK OFFICE
CERTIFICATE OF CORRECTION

| | |
|---|---|
| PATENT NO. | : 11,136,098 B2 |
| APPLICATION NO. | : 16/544691 |
| DATED | : October 5, 2021 |
| INVENTOR(S) | : Timothy C. Haynes et al. |

Page 1 of 1

It is certified that error appears in the above-identified patent and that said Letters Patent is hereby corrected as shown below:

In the Claims

Claim 19, Column 14, Line 33, please delete "restrain" and insert -- restraint --

Claim 20, Column 14, Line 43, please delete "restrain" and insert -- restraint --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*